(12) United States Patent
Norenburg et al.

(10) Patent No.: US 10,795,849 B2
(45) Date of Patent: Oct. 6, 2020

(54) SYSTEM OF AUTOMATION COMPONENTS AND METHOD FOR OPERATING THE SAME

(71) Applicant: SEW-EURODRIVE GMBH & CO. KG, Bruchsal (DE)

(72) Inventors: Benjamin Norenburg, Karlsdorf-Neuthard (DE); Christian Senft, Karlsruhe-Grünwettersbach (DE); Sebastian Richter, Heidelberg (DE)

(73) Assignee: SEW-EURODRIVE GMBH & CO. KG (DE)

( * ) Notice: Subject to any disclaimer, the term of this patent is extended or adjusted under 35 U.S.C. 154(b) by 0 days.

(21) Appl. No.: 16/315,476

(22) PCT Filed: Jun. 20, 2017

(86) PCT No.: PCT/EP2017/025172
§ 371 (c)(1),
(2) Date: Jan. 4, 2019

(87) PCT Pub. No.: WO2018/007019
PCT Pub. Date: Jan. 11, 2018

(65) Prior Publication Data
US 2019/0317914 A1    Oct. 17, 2019

(30) Foreign Application Priority Data
Jul. 4, 2016   (DE) ................. 10 2016 008 009

(51) Int. Cl.
*G06F 13/40*   (2006.01)
*G06F 3/06*    (2006.01)
(Continued)

(52) U.S. Cl.
CPC ........ *G06F 13/4081* (2013.01); *G06F 3/0607* (2013.01); *G06F 3/0658* (2013.01);
(Continued)

(58) Field of Classification Search
CPC ... G06F 3/0658; G06F 3/0679; G06F 13/4081
See application file for complete search history.

(56) References Cited

U.S. PATENT DOCUMENTS

| | | | |
|---|---|---|---|
| 7,463,149 B2 | 12/2008 | Friedrich et al. | |
| 2001/0054841 A1* | 12/2001 | Ross | B60T 13/683 303/20 |

(Continued)

FOREIGN PATENT DOCUMENTS

| | | |
|---|---|---|
| DE | 19960870 A1 | 6/2001 |
| DE | 10259391 A1 | 7/2004 |

(Continued)

OTHER PUBLICATIONS

International Preliminary Report on Patentability issued in International Patent Application No. PCT/EP2017/025172, dated Jan. 8, 2019 (7 pages).

(Continued)

*Primary Examiner* — Glenn A. Auve
(74) *Attorney, Agent, or Firm* — Carter, DeLuca & Farrell LLP (57) ABSTRACT

A system of automation components, having a control unit, having a memory area which includes a parameter data record, and a key memory, which is able to be connected to the control unit via an unambiguously allocatable, electrically conductive connection. The key memory is location-bound, in particular able to be spatially fixedly allocatable to a specific point in a system as a whole, the key memory having at least one non-volatile memory area, including an unambiguous item of identifying information. The control unit is able to read out the identifying information. The system also includes an external data memory, which is able to be directly accessed, and data is able to be exchanged between the control unit and the external data memory.

16 Claims, 5 Drawing Sheets

(51) Int. Cl.
*G06F 9/4401* (2018.01)
*G06F 13/16* (2006.01)
(52) U.S. Cl.
CPC .......... *G06F 3/0679* (2013.01); *G06F 9/4413* (2013.01); *G06F 13/1668* (2013.01)

(56) References Cited

U.S. PATENT DOCUMENTS

| | | | |
|---|---|---|---|
| 2002/0169914 A1 | 11/2002 | Shteyn | |
| 2005/0108442 A1* | 5/2005 | Aschenbrenner | G05B 19/0423 710/1 |
| 2006/0013213 A1* | 1/2006 | Takahashi | H04N 21/4345 370/389 |
| 2006/0142876 A1 | 6/2006 | Kalhoff et al. | |
| 2008/0303472 A1* | 12/2008 | John | G05B 19/0426 318/568.2 |
| 2013/0261277 A1 | 10/2013 | Keutner et al. | |

FOREIGN PATENT DOCUMENTS

| | | |
|---|---|---|
| DE | 102004050383 A1 | 4/2006 |
| DE | 102006019542 A1 | 10/2007 |
| DE | 102009028794 A1 | 2/2011 |
| DE | 102013211582 A1 | 12/2014 |
| DE | 102014115406 A1 | 4/2016 |
| WO | WO 2012079902 A1 | 6/2012 |

OTHER PUBLICATIONS

International Search Report dated Nov. 11, 2017, in International Application No. PCT/EP2017/025172 (English-language translation).

* cited by examiner

SYSTEM OF AUTOMATION COMPONENTS AND METHOD FOR OPERATING THE SAME

FIELD OF THE INVENTION

The present invention relates to a system of automation components and to a method for operating the same.

BACKGROUND INFORMATION

In certain conventional systems, properties of a control unit can be modified via a parameterization device.

In addition, in certain conventional systems, a parameter data record can be transmitted from a parameterization device to a control unit.

In certain conventional systems, after an exchange of an already parameterized control unit, the exchanged control unit must be parameterized again.

German Published Patent Application No. 10 2008 045 476 describes that individual components of a system exchange information with one another.

German Published Patent Application No. 103 50 715 describes a method for storing parameter values in an internal and/or external data memory.

German Published Patent Application No. 10 2006 035 112 describes that system components include device-identification features which are supplied to a control unit when a component is exchanged.

German Published Patent Application No. 102 59 391 describes a location-specific adaptation of an intelligent unit.

A measuring device for determining a physical or chemical measured quantity of a medium to be measured is described in German published Patent Application No. 10 2009 028 794.

U.S. Patent Application Publication No. 2002/0169914 describes an identification device for a system environment.

German Published Patent Application No. 199 60 870 describes an electronic switching device.

German Published Patent Application No. 10 2004 050 383 describes a transmission of data in automation components.

German Published Patent Application No. 10 2014 115 406 describes a system for the wireless configuration of small control devices.

SUMMARY

Example embodiments of the present invention provide for minimizing the idle time of a production plant, and thus the economic costs.

According to example embodiments of the present invention, the problem of a reparameterization in an exchange of a typically defective control unit is addressed in that during the first start-up and/or during any further modification of the adjustment parameters of this control unit, the adjustment parameters are additionally saved in a data memory, which is usually situated on or in a converter and/or on or in a higher-level control and/or on a PC that is connected to the control.

From this data memory, the adjustment parameters for an exchanged device are able to be recovered, the exchanged control unit being identifiable only by a parameter data record specifically provided for this control unit, which is able to be executed via the identifying information of an external key memory, in particular an external key memory which is spatially located outside the control unit, is location-bound and, in particular, is fixedly allocatable to a specific point in the system and directly connected to this control unit in an electrically conductive manner.

According to an example embodiment of the present invention, a system of automation components includes: a control unit, having a memory area that includes a parameter data record, the parameter data record being required to operate the control unit; a key memory, which is connectable to the control unit via an unambiguously allocatable electrically conductive connection, the key memory being location-bound, in particular spatially fixedly allocatable to a specific point in a system as a whole, the key memory having at least one non-volatile memory area, the memory area including unambiguous identifying information, the control unit being able to read out this identifying information; and an external data memory, which is directly accessible, in particular via a plug-in connection, or via a system, in particular a field-bus system, the data memory having at least one non-volatile memory area, the memory area having at least one parameter data record, each one of the parameter data records being unambiguously linked to an individual item of identifying information, and data are able to be exchanged between the control unit and the external data memory.

This has the advantage that the identifying information of the control unit is externally stored in a location-bound key memory, independently of the control unit itself, which means that a parameter data record, linked to this identifying information, from an external data memory is unambiguously allocatable to an exchanged device again. In addition, the identifying information may also be recorded in the EPLAN and makes it possible to reference the control unit in an unambiguous manner at all times, even after a device has been exchanged.

As a result, the idle time of a production system, and thus the economic costs, are minimized in that a simple and time-optimized device exchange of control units, in particular of closed-loop and/or open-loop control units that are programmable via a memory, is possible.

According to an example embodiment of the present invention, a system of automation components includes: a first control unit, including an additional, non-volatile memory area, the memory area including the device-identification feature of the control unit; a further control unit, which also has an additional, non-volatile memory area, the memory area including the device-identification feature of the control unit, the control units are of different device types, a device-identification feature being unambiguously allocated to each of these device types, the device-identification features being different; and a key memory, which is able to be connected to the control units via an unambiguously allocatable, electrically conductive connection, the control units being able to read the identifying information included in the key memory, each parameter data record available in the external data memory being linked to an individual device-identification feature, in addition to the identifying information. This has the advantage that a plurality of control units shares a key memory, thereby making it possible to reduce the number of required key memories.

According to an example embodiment of the present invention, a system of automation components includes: a first control unit, including an additional, non-volatile memory area, the memory area including the device-identification feature of the control unit; a further control unit, which also includes an additional, non-volatile memory area, the memory area including the device-identification feature of the control unit, the control units being of different device types, a device-identification feature being unambiguously allocated to each of these device types, the device-identification features being different, the control unit being directly connected to the further control unit in an electrically conductive manner; a key memory, which is connectable to the control unit via an unambiguously allocatable electrically conductive connection, the control unit being able to read the identifying information included in the key memory, the control unit making this identifying information available to the directly connected additional control unit, each parameter data record available in the external data memory being linked to an individual device-identification feature, in addition to the identifying information. This has the advantage that a plurality of control units shares a key memory, which makes it possible to reduce the number of required key memories.

The key memory may be integrated into a separate housing, in particular into a dongle housing, the separate housing having only one plug-connector element, the one plug-connector part being able to be directly connected to the control unit in an electrically conductive manner. This has the advantage that the key memory is able to be used in a flexible manner while the plug connector has a minimal size.

The key memory may be integrated into a connector plug of a connection cable, the connector plug being directly connectable to the control unit via a plug-connector element, the connector plug additionally having a device for accommodating a connection cable for the connection to a further automation component, in particular a drive unit, the connection cable being additionally usable for the transmission of further control and/or power signals. This offers the advantage that the location-bound reference of the key memory is implicitly given by the installation in the system. This makes it possible to load only the configuration data for the devices that are connected to this connection cable.

The key memory may be arranged to be integrated into a drive unit, in particular to be integratable by being plugged in, the drive unit having additional sensors and/or actuators, in particular a motor (M) and/or a rotary encoder and/or a distance encoder and/or a brake and/or a temperature sensor, the drive unit having a plug-connector element, the key memory being able to be directly connected to the control unit via this plug-connector element, in particular via a connection line, the connection cable additionally being usable for the transmission of further control and/or power signals. This has the advantage that the location-bound reference of the key memory is implicitly given by the installation in the system. Only the matching configuration data for this drive unit are thereby able to be loaded.

The key memory may be able to be read out by the control unit via an electrically conductive connection made up of only two lines, which particularly is arranged as a one-wire bus and/or using a coaxial cable having only a single internal conductor. This allows for a compact and cost-effective configuration of the key memory at a reduced wiring outlay while simultaneously providing protection from interference radiation on the connection line.

The key memory may be fixedly connectable to the location in which the control unit is also installed in the system as a whole, using a device, in particular a connection chain. This has the advantage that the location-bound reference of the key memory within the system as a whole is emphasized and protection against the loss of the key memory itself is able to be obtained in addition.

The external data memory may be directly connectable to a higher-level control via a plug-connector element, the higher-level control being connectable to the control unit via a field-bus system. This is considered advantageous inasmuch as it makes it possible to operate a multitude of control units using only one external memory.

The device-identification feature may be arranged as a EAN (European Article Number) and/or a GTIN (Global Trade Item Number). This has the advantage of allowing for an unambiguous identification of the device type of the control unit.

According to an example embodiment of the present invention, in a method for operating a system, after a restart and/or a first start-up, the control unit is in an error state, the control unit reads the identifying information from the directly connected key memory, the control unit uses this identifying information to search the external data memory for a matching parameter data record that is linked to this identifying information, an available matching parameter data record is copied from the external data memory to the memory area of the control unit, the control unit switches from the error state to the operating state with the aid of the copied parameter data record, and if no matching parameter data record is available in the external data memory, the control unit remains in the error state. This has the advantage that the automatic recovery of the configuration data of a control unit after a device exchange is able to be carried out without an action by the user.

The control unit may be in an error state following a restart and/or a first start-up, the control unit reads the identifying information from the key memory, the control unit uses both this identifying information and the device-identification feature for searching the external data memory for a suitable parameter data record that is linked to the two items of identifying information, an available matching parameter data record is copied from the external data memory to the memory area of the control unit, the control unit uses the copied parameter data record to switch from the error state to the operating state, the control unit remains in the error state if no matching parameter data record is available in the external data memory. This has the advantage that it allows for the automatic recovery of the configuration data of a plurality of control units after a device exchange using only one key memory without an action on the part of the user.

A defective control unit may be removed from the system, the key memory may be removed from the defective control unit and connected to the new, exchanged control unit, and the new, exchanged control unit may assume the same function at precisely the same location in the system as had been assumed by the defective control unit. This has the advantage that the external identifying information is location-bound, which means that the reference in the system as a whole is able to be produced for the recovery of the required configuration after a device exchange.

After each restart, the control unit may search the external data memory for a matching parameter data record, and an available matching parameter data record may be copied from the external data memory to the memory area of the control unit. This has the advantage that the configuration data are independent of the control unit because the configuration data are not stored in the control unit itself but are able to be loaded if the need arises.

The memory area of the control unit may be arranged as a non-volatile memory, in particular as an EEPROM, flash or a comparable memory, and in a restart, an available matching parameter data record may be fetched from the external data memory only if the memory area does not have a parameter data record available and/or the parameter data record included in the memory area is defective, a defective parameter data record being detected by a comparison with the identifying information, in particular by a check-sum comparison of the parameter data record with the identifying information. This has the advantage that an access to the external data memory must take place only in an emergency, and the bus loading is able to be reduced as a result.

The memory area of the control unit may include a non-volatile memory, in particular as an EEPROM, flash or similar memory, and in a restart, an available matching parameter data record being fetched from the external data memory only if the memory area does not have a parameter data record available and/or if the parameter data record included in the memory area is defective, a defective parameter data record being detected by a comparison both with the identifying information and the device-identification feature, in particular by a check-sum comparison of the parameter data record both with the identifying information and the device-identification feature. This has the advantage that an access to the external data memory must take place only in an emergency, and the bus loading is able to be reduced as a result.

A parameter data record may be able to be linked to a key memory and to the identifying information included therein and storable in the external data memory, and a parameter data record may be able to be linked to a key memory and to the identifying information included therein and likewise storable in the external data memory, the selection of the key memory directly electrically connected to the control unit or, in particular during a restart of the control unit, leading to the loading of the corresponding adapted parameter data record or from the external data memory to the control unit. This has the advantage that the operating type of the control unit is selectable via different external and location-bound key memories, so that preproduced, in particular already validated, data records from an external data memory, in particular from a CLOUD, are accessible by the control unit.

Further features and aspects of example embodiments of the present invention are described in greater detail below with reference to the appended Figures.

DETAILED DESCRIPTION

Figure 1:
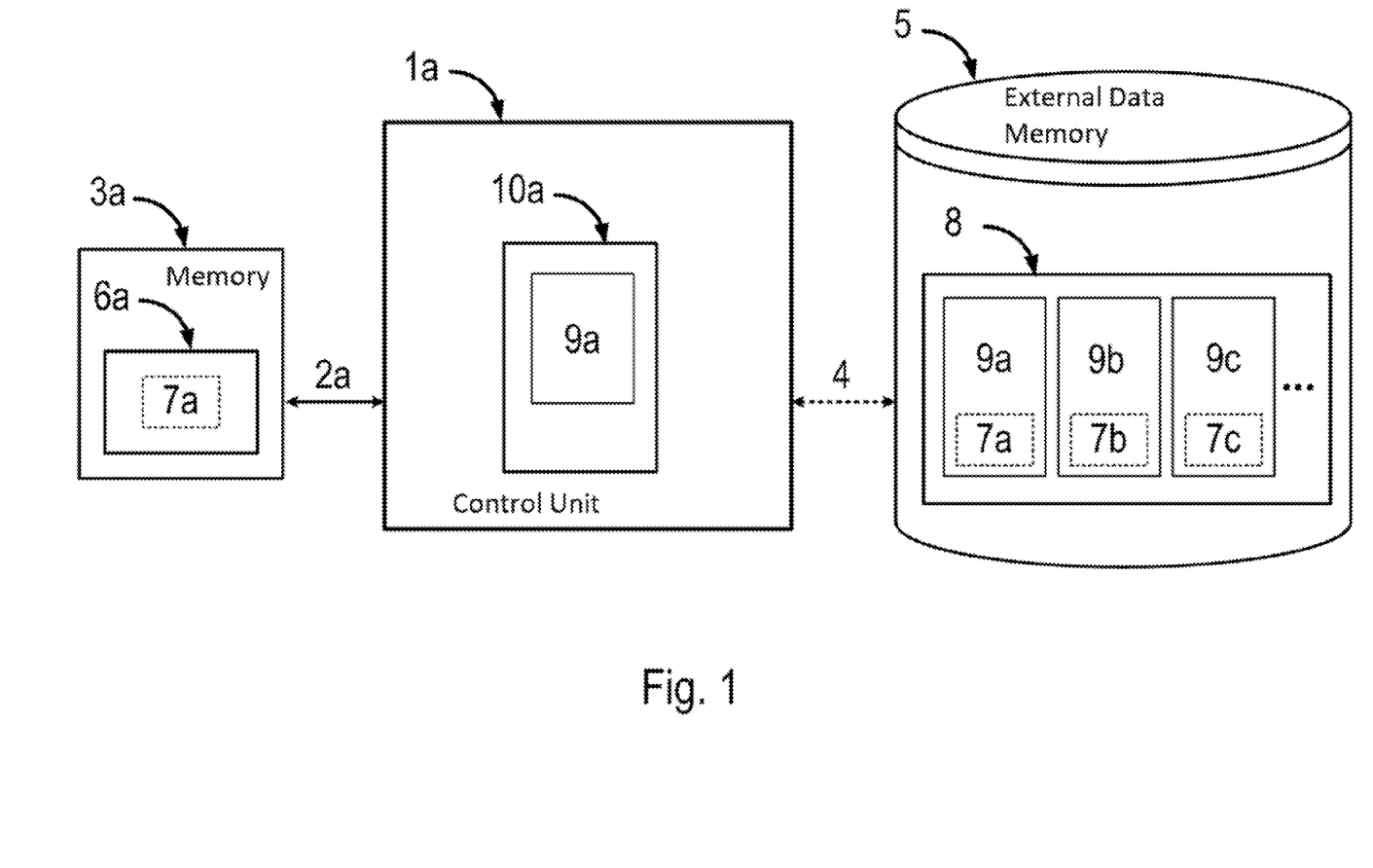
FIG. 1 schematically illustrates a system of automation components according to an example embodiment of the present invention.

In FIG. 1, a system of automation components according to an example embodiment of the present invention is schematically illustrated. The control unit (1a) is linked to the key memory (3a) via a directly allocatable, electrically conductive connection (2a). As a result, the control unit (1a) is able to access only the identifying information (7a) of the key memory (3a) that is located in the non-volatile memory area (6a).

Moreover, the control unit (1a) is connected, either directly or via a system (4), to an external data memory (5). This data memory (5) makes room in its non-volatile memory area (8) for parameter data records (9) that are linked to identifying information (7), in particular. For example, during the first start-up and/or in each further modification of the parameter data record (9a), this parameter data record (9a) has been transmitted via a device, in particular a parameterization device, both to the memory area (10a) of the control unit (1a) and, as a shadow copy, to the non-volatile memory area (8) of the external data memory (5). Using the identifying information (7a) of the key memory (3a), the control unit (1a) is able to search the external data memory (5) for the matching parameter data record (9a) and to load it into the internal memory area (10a) if the search was successful.

Figure 2:
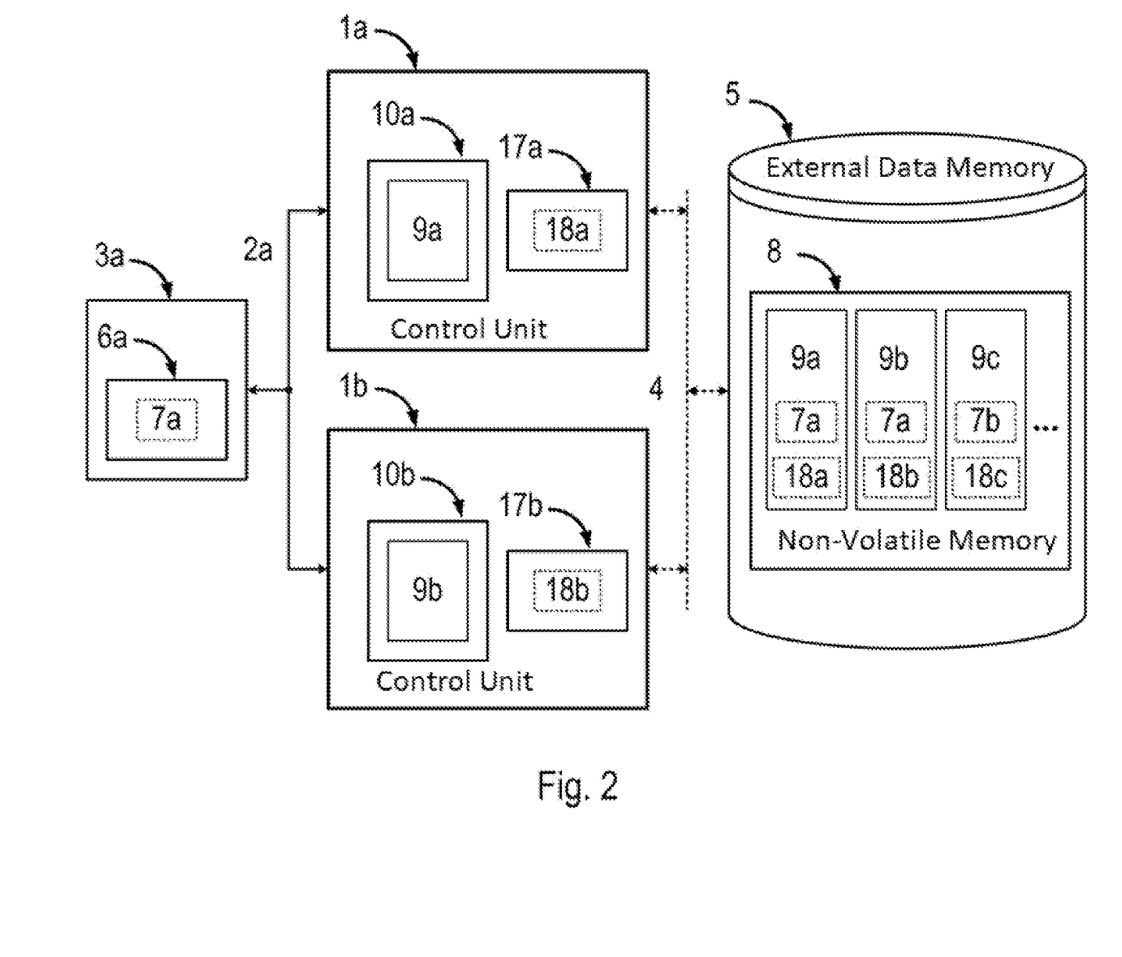
FIG. 2 schematically illustrates another system of automation components according to an example embodiment of the present invention.

In FIG. 2, another system of automation components according to an example embodiment of the present invention is schematically illustrated. In this instance, the key memory (3a) is connected to the control units (1a) and (1b) via a directly allocatable, electrically conductive connection (2a). As a result, the control units (1a) and (1b) have access only to the identifying information (7a) of precisely one key memory (3a).

In addition, each control unit (1a, 1b) has a device-identification feature (18a, 18b), these device-identification features (18) being linked to the parameter data records (9) and being used together with the identifying information (7a) for the selection of the matching parameter data record (9a, 9b) in the external data memory (5).

In another exemplary embodiment, the control unit (1a) is linked to the key memory (3a) via a directly allocatable electrically conductive connection (2a) and the identifying information (7a) included therein is made available via the control unit (1a) to a further control unit (1b) by way of a directly allocatable, electrically conductive connection between control unit (1a) and control unit (1b).

Figure 3:
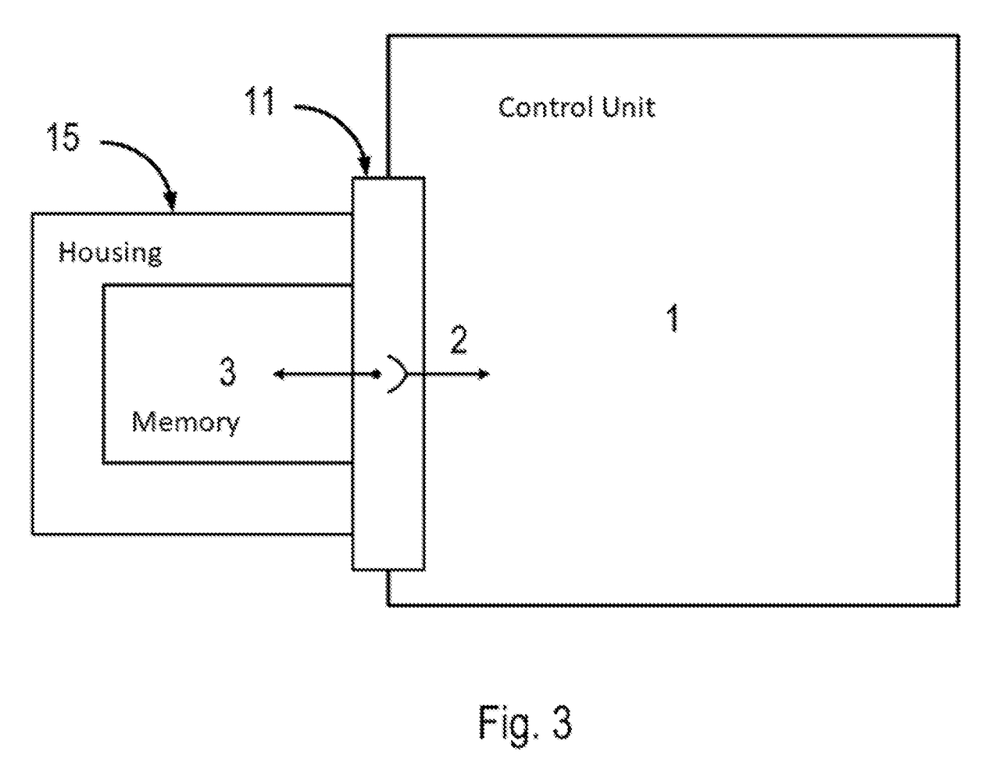
FIGS. 3, 4, and 5 schematically illustrate configurations of the directly allocatable, electrically conductive connection between a control unit and a key memory.
Figure 4:
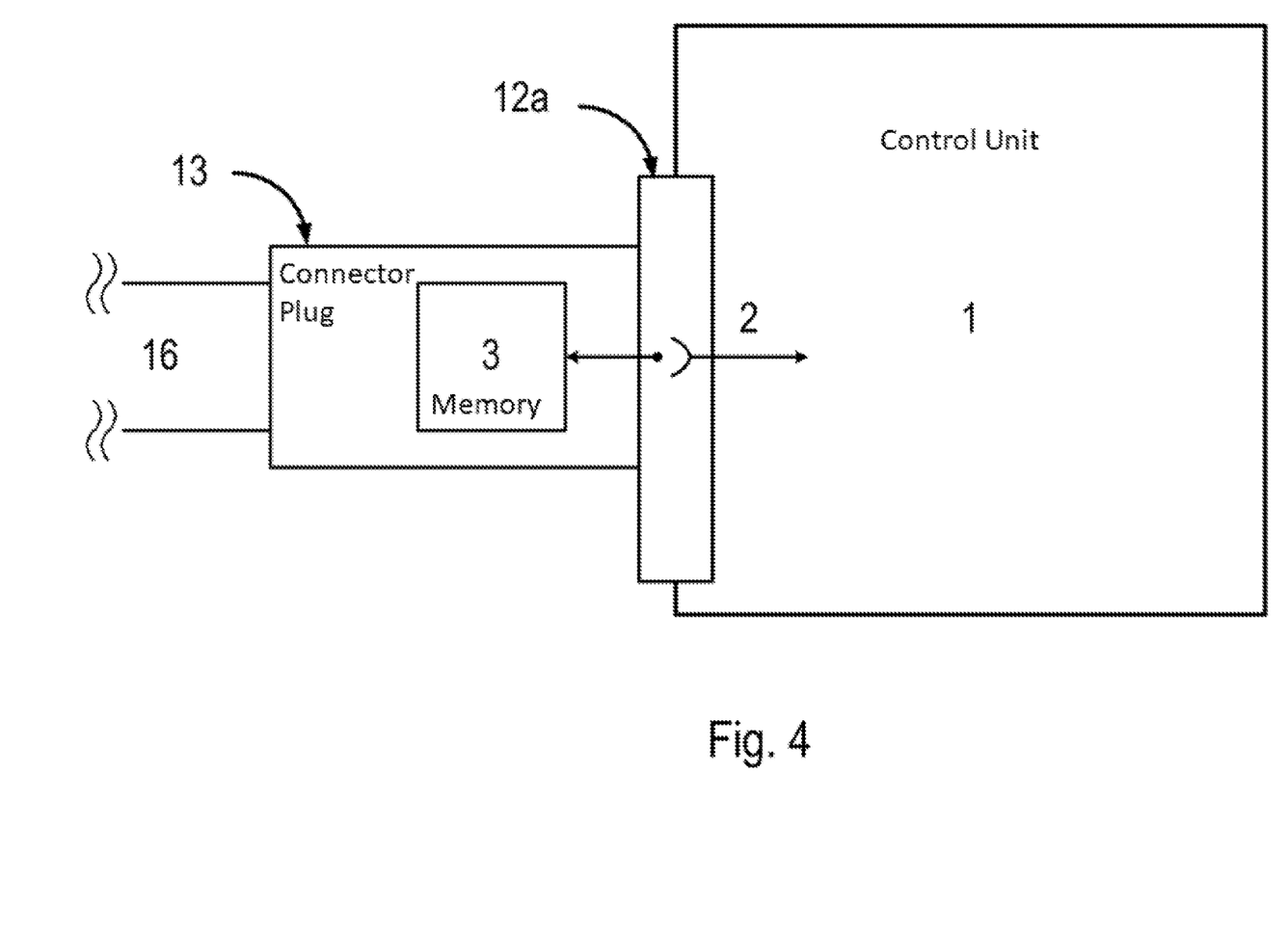
Figure 5:
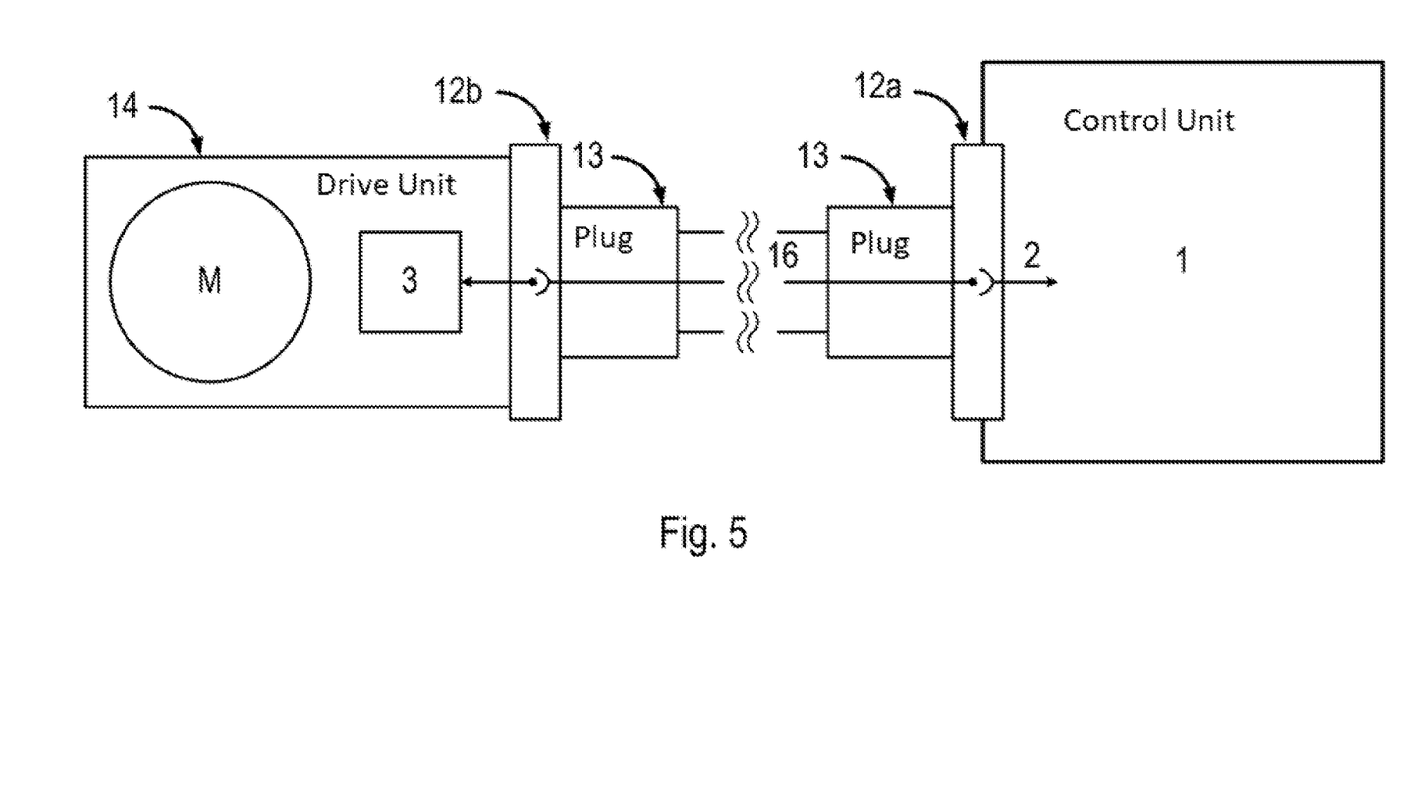

FIGS. 3, 4 and 5 exemplarily show mechanical developments of the directly allocatable, electrically conductive connection (2) between control unit (1) and key memory (3).

FIG. 3 shows a separately realized key memory (3), in particular in the form of a circuit that has been integrated into a dongle housing (15). In this application, the location-bound reference of the key memory (3) must be ensured by organizational measures.

FIG. 4 shows the key memory (3) as a circuit which is integrated into a connector plug (13) of a connection line (16). The location-bound reference of the key memory (3) is thereby implicitly ensured by the installation of the connection cable (16) in a system.

In FIG. 5, the key memory (3) is illustrated as a circuit that is integrated into a drive unit (14). Thus, the location-bound reference of the key memory (3) is implicitly ensured by the installation of the drive unit (14) in a system. At the same time, it is ensured in this application that only the parameter data record (9) that is intended for this drive unity (14) is loaded into the connected control unit (1).

LIST OF REFERENCE CHARACTERS (1) control unit
(2) directly allocatable, electrically conductive connection between control unit (1) and key memory (3)
(3) location-bound key memory
(4) connection between external data memory (5) and control unit (1)
(5) external data memory
(6) non-volatile memory area of the location-bound key memory (3)
(7) identifying information (8) non-volatile memory area of the external data memory (5)
(9) parameter data record of the control unit (1)
(10) memory area of the control unit (1)
(11) plug connector between control unit (1) and key memory (3)
(12) plug connection for connecting a location-bound connection cable
(13) connector plug of a connection cable
(14) drive unit having integrated sensors and actuators
(15) housing, in particular a dongle housing
(16) connection line, in particular for the transmission of further control and/or power signals
(17) further non-volatile memory area of the control unit (1)
(18) device-identification feature
(M) motor

The invention claimed is:

1. A system of automation components, comprising:
a control unit including a memory area adapted to store a parameter data record required for operation of the control unit;
a key memory connectable to the control unit via a specifically allocatable, electrically conductive connection, the key memory being location-bound and/or spatially fixedly allocatable to a specific point in a system as a whole, the key memory including at least one non-volatile memory area adapted to store a specific item of identification information, the control unit adapted to read out the identification information; and
an external data memory (a) directly accessible, (b) directly accessible via a plug-in connection, and/or (c) accessible via a system and/or a field-bus system, the external data memory including at least one non-volatile memory area adapted to store at least one parameter data record, each being specifically linked to an item of identification information;
wherein the control unit and the external data memory are adapted to exchange information therebetween.

2. The system according to claim 1, wherein the system is adapted to operate at least one electric motor.

3. The system according to claim 1, wherein the control unit includes a second non-volatile memory area adapted to store a device-identification feature, the system further comprising a second control unit including a third non-volatile memory area adapted to store a device-identification feature of the second control unit, the control unit and the second control unit being of different device types, the device-identification features being specifically associated with each of these device types, the device-identification feature of the control unit being different than the device-identification feature of the second control unit, the key memory connectable to the control unit and the second control unit via the specifically allocatable, electrically conductive connection, the control unit and the second control unit adapted to read identifying information stored in the key memory, each parameter data record available in the external data memory being linked to a device-identification feature and to the identifying information.

4. The system according to claim 1, wherein the control unit includes a second non-volatile memory area adapted to store a device-identification feature of the control unit, the system further comprising a second control unit including a non-volatile memory area adapted to store a device-identification feature of the second control unit, the control unit and the second control unit being of different device types, a device-identification feature being specifically associated with each of the device types and being different, the control unit being directly connected to the second control unit in a conductive manner, the control unit adapted to read identifying information stored in the key memory, the control unit being adapted to make the identifying information available to the directly connected second control unit, each parameter data record that is available in the external data memory being linked to an individual device-identification feature and to the identifying information.

5. The system according to claim 1, wherein the key memory is integrated into a separate housing and/or into a dongle housing, having only one plug-connector element directly connectable to the control unit in an electrically conductive manner.

6. The system according to claim 1, wherein the key memory is integrated into a connector plug of a connection cable, the connector plug adapted to directly connect to the control unit via a plug-connection element, the connector plug including a device adapted to accommodate a connection cable for connection to a further automation component and/or a drive unit, the connection cable adapted for transmission of further control and/or power signals.

7. The system according to claim 1, wherein the key memory is integrated within a drive unit including further sensors and/or actuators, a motor, a rotary encoder, a distance encoder, a brake, and/or a temperature sensor, the drive unit including a plug-connection element, the key memory being directly connectable to the control unit via the plug-connection element and/or via a connection line, the connection cable adapted for transmission of further control and/or power signals.

8. The system according to claim 1, wherein the control unit is adapted to read the key memory via an electrically conductive connection that includes two lines, a one-wire bus, and/or a coaxial cable having only a single inner conductor.

9. The system according to claim 1, wherein the key memory is fixedly connectable, via a connection chain, to a location at which the control unit is also installed in the system as a whole;
the external data memory is directly connectable to a higher-level control via a plug-connector element, the higher-level control being connectable to the control unit via a field-bus system; and/or
the device-identification feature includes an EAN (European Article Number) and/or a GTIN (Global Trade Item Number).

10. A method for operating a system including a control unit in an error state following a restart and/or a first start-up, comprising:
reading, by the control unit, identifying information from a directly connected key memory;
using, by the control unit, the identifying information to search an external data memory for a matching parameter data record that is linked to the identifying information;
copying an available matching parameter data record from the external data memory to a memory area of the control unit;
switching the control unit from the error state to an operating state in accordance with the copied parameter data record; and
maintaining the control unit in the error state if no matching parameter data record is available in the external data memory.

11. A method for operating a system including a control unit in an error state following a restart and/or a first start-up, comprising:

reading, by the control unit, identifying information from a key memory;

using, by the control unit, both the identifying information and a device-identification feature to search an external data memory for a matching parameter data record that is linked to the identifying information and the device-identification feature;

copying an available matching parameter data record from the external data memory to a memory area of the control unit;

switching the control unit from the error state to an operating state in accordance with the copied parameter data record; and maintaining the control unit in the error state if no matching parameter data record is available in the external data memory.

12. The method according to claim 11, further comprising:

removing a defective control unit from the system; and removing the key memory from the defective control unit and connecting the key memory to a new exchanged control unit, the new exchanged control unit assuming a same function at precisely a same location in the system as assumed by the defective control unit.

13. The method according to claim 11, wherein after each restart, the control unit searches the external data memory for a matching parameter data record, and an available matching parameter data record is copied from the external data memory to the memory area of the control unit.

14. The method according to claim 11, wherein the memory area of the control unit includes a non-volatile memory, an EEPROM, and/or a flash memory, and during a restart, an available matching parameter data record is fetched from the external data memory only if the memory area does not include a parameter data record and/or the parameter data record included in the memory area is defective, a defective parameter data record being detected by a comparison with the identifying information and/or by a check-sum comparison of the parameter data record with the identifying information.

15. The method according to claim 11, wherein the memory area of the control unit includes a non-volatile memory, an EEPROM, and/or a flash memory, and during a restart, an available matching parameter data record is fetched from the external data memory only if the memory area does not include a parameter data record and/or the parameter data record included in the memory area is defective, a defective parameter data record being detected by a comparison both with the identifying information and the device-identification feature and/or by a check-sum comparison of the parameter data record both with the identifying information and the device-identification feature.

16. The method according to claim 11, wherein a parameter data record is linkable to a key memory and to the identifying information included therein and stored in the external data memory, and a parameter data record is linkable to a key memory and to the identifying information included therein and also stored in the external data memory, a selection of the key memory directly electrically connected to the control unit, during a restart of the control unit, resulting in loading a corresponding adapted parameter data record from the external data memory into the control unit.

* * * * *